(12) United States Patent
Kao (10) Patent No.: US 10,956,318 B2
(45) Date of Patent: Mar. 23, 2021

(54) OVERLAPPING RANGES OF PAGES IN MEMORY SYSTEMS

(71) Applicant: Macronix International Co., Ltd., Hsinchu (TW)

(72) Inventor: Hung-Jen Kao, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 305 days.

(21) Appl. No.: 16/012,321

(22) Filed: Jun. 19, 2018

(65) Prior Publication Data

US 2019/0384706 A1   Dec. 19, 2019

(51) Int. Cl.
*G06F 12/02* (2006.01)

(52) U.S. Cl.
CPC ...... *G06F 12/0292* (2013.01); *G06F 12/0246* (2013.01); *G06F 2212/2022* (2013.01); *G06F 2212/7201* (2013.01)

(58) Field of Classification Search
None
See application file for complete search history.

(56) References Cited

U.S. PATENT DOCUMENTS

2005/0144358 A1   6/2005   Conley et al.

FOREIGN PATENT DOCUMENTS

CN   1902599 B   12/2011

OTHER PUBLICATIONS

Gupta et al., DFTL: A Flash Translation Layer Employing Demand-based Selective Caching of Page level Address Mappings, 2009, ACM, pp. 229-240 (12 pages) (Year: 2009).*
Chung, Tae-Sun et al., "A survey of Flash Translation Layer", Journal of Systems Architecture, vol. 55:332-343, 2009.

* cited by examiner

*Primary Examiner* — Gary W. Cygiel
(74) *Attorney, Agent, or Firm* — Fish & Richardson P.C.

(57) ABSTRACT

Systems, methods, and apparatus including computer-readable mediums for managing memories by overlapping ranges of pages in nonvolatile memory systems are provided. An example memory system includes a memory controller coupled to a memory and configured to: determine a range of logical addresses associated with a command, search particular mapping tables including the range of logical addresses in mapping pages in the memory, determine whether a starting address of the range of logical addresses is in an overlapped range of first and second sequential mapping pages, the overlapped range including logical addresses of one or more mapping tables duplicated in the first and second mapping pages, determine which of the first and second mapping pages from which the particular mapping tables to be loaded based on a result of determining whether the starting address is in the overlapped range, and load the particular mapping tables from the determined mapping page.

21 Claims, 7 Drawing Sheets

OVERLAPPING RANGES OF PAGES IN MEMORY SYSTEMS

BACKGROUND

Some memory systems, e.g., flash memory system, have an erase-before-write architecture. To update a location in a flash memory system, the location must first be erased before new data can be written to it. The smallest memory portion for erasing (e.g., a block) is larger in size than that for reading or writing (e.g., a sector), which results in a major performance degradation of the overall flash memory system. In some cases, Flash Translation Layer (FTL) is introduced in the flash memory system to manage read, write, and erase operations. At the core of an FTL is using a logical-to-physical address mapping table. If a physical address location mapped to a logical address contains previously written data, input data is written to an empty physical location in which no data were previously written. The mapping table is then updated due to the newly changed logical/physical address mapping.

SUMMARY

The present disclosure describes systems, methods and techniques for overlapping ranges of pages in memory systems, e.g., non-volatile memory systems such as NAND flash memory.

One aspect of the present disclosure features a memory system of managing a memory by overlapping ranges of mapping pages. The memory system includes a memory controller coupled to the memory and configured to: write input data in the memory, the written input data having corresponding physical addresses; add mapping between the physical addresses and logical addresses to one or more mapping tables in a table cache of the memory controller; determine that a number of mapping tables in the table cache reaches a threshold number; program the mapping tables in the table cache into a first mapping page in the memory; and copy one or more particular mapping tables programmed at an end of the first mapping page to a beginning of the table cache in a second, sequential mapping page to form an overlapped range of mapping tables between the first and second mapping pages. The memory system can include the memory.

In some implementations, the memory controller is configured to program the one or more particular mapping tables at the end of the first mapping page to a beginning of the second mapping page. The one or more particular mapping tables are duplicated in the first and second mapping pages, and a range of logical addresses of the one or more particular mapping tables forms the overlapped range of the first and second mapping pages.

The memory controller can be configured to determine the logical addresses mapped with the physical addresses based on the physical addresses and information of the mapping tables in the table cache.

Each mapping page in the memory can be capable of storing a maximum table number of mapping tables, and the threshold number can be identical to the maximum table number.

In some implementations, the memory controller is configured to receive a host read command from a host device. The read command is allowable to read user data associated with a range of logical addresses included in a maximum read number of mapping tables in the memory, and a number of the one or more particular mapping tables can be identical to the maximum read number minus 1. The maximum read number of mapping tables for the host read command can be determined based on a communication protocol between the memory controller and the host device. A number of logical addresses in the range of logical addresses can be no more than a number of logical addresses included in the one or more particular mapping tables.

Another aspect of the present disclosure features a memory system of managing a memory by overlapping ranges of mapping pages. The memory system includes a memory controller coupled to the memory and configured to: receive a read command; determine a range of logical addresses associated with the read command; search particular mapping tables including the range of logical addresses in mapping pages in the memory, a mapping page in the memory including sequential mapping tables and adjacent mapping pages in the memory including one or more duplicated mapping tables with an overlapped range; determine whether a starting address of the range of logical addresses is in a respective overlapped range of first and second mapping pages in the memory, the second mapping page being sequential to the first mapping page, the first and second mapping pages including one or more respective duplicated mapping tables, a range of logical addresses of the respective duplicated mapping tables forming the respective overlapped range of the first and second mapping pages; determine which of the first and second mapping pages from which the particular mapping tables to be loaded based on a result of determining whether the starting address is in the respective overlapped range of the first and second mapping pages; and load the particular mapping tables from the determined mapping page. The memory system can include the memory.

The memory controller can be configured to: in response to determining that the starting address is in the overlapped range of the first and second mapping pages, load the particular mapping tables from the second mapping page.

In some implementations, the memory controller is configured to: in response to determining that the starting address of the range of logical addresses is smaller than a minimum logical address of the overlapped range and in the first mapping page, load the particular mapping tables from the first mapping page; and in response to determining that the starting address of the range of logical addresses is larger than a maximum logical address of the overlapped range and in the second mapping page, load the particular mapping tables from the second mapping page.

In some implementations, the memory controller is configured to: obtain physical addresses mapped to the range of logical addresses based on the loaded particular mapping tables; and read user data having the obtained physical addresses from the memory.

The first mapping page can include the respective duplicated mapping tables at an end of the first mapping page, and the second mapping page can include the respective duplicated mapping tables at a beginning of the second mapping page.

The read command can be allowable to read user data associated with logical addresses included in a maximum read number of mapping tables in the memory, and a number of the respective duplicated mapping tables can be identical to the maximum read number minus 1. The maximum read number of mapping tables for the read command can be determined based on a communication protocol between the memory controller and a host device transmitting the read command.

In some implementations, the memory controller is configured to: receive a second read command; determine that a second range of logical addresses associated with the second read command is included in second particular mapping tables in a table cache of the memory controller; obtain second physical addresses mapped to the second range of logical addresses based on the second particular mapping tables in the table cache; and read user data having the obtained second physical addresses from the memory.

The memory controller can be configured to: search the particular mapping tables including the range of logical addresses in the mapping pages in the memory in response to determining that the range of logical addresses is not included in second particular mapping tables in a table cache of the memory controller.

A further aspect of the present disclosure features a memory system of managing a memory by overlapping ranges of mapping pages. The memory system includes a memory controller coupled to the memory and configured to: receive a host write command from a host device; write host data associated with the host write demand in the memory, the written host data having corresponding physical addresses in the memory; add mapping between the physical addresses and logical addresses mapping data in a cache of the memory controller; program the mapping data in the cache into first and second adjacent mapping pages, where the first and second adjacent mapping pages have an overlapped range including particular mapping data; receive a host read command from the host device; determine a range of logical addresses associated with the host read command; load, to the cache, corresponding mapping data including the range of logical addresses from a particular mapping page in the memory; obtain physical addresses mapped to the range of logical addresses based on the loaded corresponding mapping tables; and read user data having the obtained physical addresses from the memory.

The memory system can include the memory. In some examples, the memory includes a non-volatile memory (NVM), and the cache is included in a static random access memory (SRAM) in the memory controller.

The mapping data can be in a form of mapping table. In some implementations, the memory controller is configured to program the mapping data in the cache into the first and second adjacent mapping pages by determining that a number of mapping tables in the cache reaches a table number of mapping tables capable to be stored in a memory page of the memory, programming the mapping tables in the cache into the first mapping page in the memory, copying one or more particular mapping tables programmed at an end of the first mapping page to a beginning of the table cache, and programming the second mapping page including the one or more particular mapping tables of the first mapping page at a beginning of the second mapping page. The one or more particular mapping tables can be the duplicated particular mapping data of the first and second mapping pages and a range of the particular mapping tables can form the overlapped range of the first and second mapping pages.

In some implementations, the memory controller is configured to: search the corresponding mapping data including the range of logical addresses in mapping pages in the memory; determine whether a starting address of the range of logical addresses is in the overlapped range of the first and second mapping pages in the memory; determine which of the first and second mapping pages to be the particular memory page from which the corresponding mapping data to be loaded based on a result of determining whether the starting address is in the overlapped range of the first and second mapping pages; and load, to the cache, the corresponding mapping data including the range of logical addresses from the particular mapping page in the memory.

The memory controller can be configured to: in response to determining that the starting address is in the overlapped range of the first and second mapping pages, load the corresponding mapping data from the second mapping page; in response to determining that the starting address of the range of logical addresses is smaller than a minimum logical address of the overlapped range and in the first mapping range, load the corresponding mapping data from the first mapping page; and in response to determining that the starting address of the range of logical addresses is larger than a maximum logical address of the overlapped range and in the second mapping page, load the corresponding mapping data from the second mapping page.

In some implementations, the mapping data is in the form of mapping table. The host read command can be allowable to read data associated with logical addresses included in a maximum read number of mapping tables in the memory, and a number of the duplicated mapping tables can be identical to the maximum read number minus 1.

A fourth aspect of the present disclosure features a memory system of managing a memory by overlapping ranges of pages. The memory system includes a memory controller coupled to the memory and configured to: write input data in the memory, the written input data having corresponding physical addresses; add reference data corresponding to the written input data to a cache of the memory controller; program a list of reference data in the cache into a first page in the memory; and copy a portion of the list of reference data programmed at an end of the first page to a beginning of a second page to form an overlapped range of the first and second pages. The portion of the list of reference data is duplicated in the first and second pages to form the overlapped range of the first and second pages.

The memory controller can be further configured to: load particular reference data corresponding to a read command from a particular page in the memory; obtain physical addresses corresponding to the loaded particular reference data; and read stored data having the obtained physical addresses from the memory.

In some implementations, the memory controller is configured to: search the particular reference data in pages in the memory; determine whether a start of the particular reference data is in the overlapped range of the first and second pages in the memory; determine which of the first and second pages to be the particular page from which the particular reference data to be loaded based on a result of determining whether the start of the particular reference data is in the overlapped range of the first and second pages; and load, to the cache, the particular reference data from the particular page in the memory.

In some cases, in response to determining that the start is in the overlapped range of the first and second pages, the memory controller is configured to load the particular reference data from the second page. In some cases, in response to determining that the start of the particular reference data is smaller than a minimum of the overlapped range and in the first page, the memory controller is configured to load the particular reference data from the first page. In some cases, in response to determining that the start of the particular reference data is larger than a maximum of the overlapped range and in the second page, the memory controller is configured to load the particular reference data from the second page.

In a particular example, the reference data is in the form of mapping table including mapping between physical addresses and logical addresses. The page can be a mapping page including a plurality of mapping tables.

A fifth aspect of the present disclosure features a memory system of managing a memory by overlapping ranges of pages. The memory system includes a memory controller coupled to the memory and configured to: program data into a first page in the memory and copy a portion of the data programmed at an end of the first page to a beginning of a second page to form an overlapped range of the first and second pages. The data can be input data, e.g., from a write command. The data can be mapping table or data to be written in pages. The data can be any form of data, e.g., manufacture information, testing information in any pages. The page can be a logical page, a mapping page, or a physical page.

Implementations of the above techniques include methods, systems, computer program products and computer-readable media. In one example, a method can be performed by a memory controller coupled to a non-volatile memory and the method can include the above-described actions performed by the memory controller, e.g., the actions for overlapping ranges of mapping pages in the non-volatile memory. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The techniques can be implemented for any type of controllers to read data from a memory that suffers from an over one memory page boundary problem. The techniques can provide a quick method to obtain logical addresses from mapping data in one mapping page, identify physical addresses corresponding to the logical addresses, and retrieve corresponding data with the physical addresses in the memory. The techniques can be implemented by duplicating data in adjacent pages to obtain overlapped ranges of the adjacent pages. The data can be in the form of mapping table or in any other suitable form such as manufacture information or testing information. The page can be a mapping page, a physical page, or a logical page.

The techniques can be applied to various types of non-volatile memory (NVM) systems, such as NAND flash memory, among others. Additionally or alternatively, the techniques can be applied to various types of devices and systems, such as secure digital (SD) cards, embedded multimedia cards (eMMC), or solid-state drives (SSDs), embedded systems, among others.

The details of one or more disclosed implementations are set forth in the accompanying drawings and the description below. Other features, aspects, and advantages will become apparent from the description, the drawings and the claims.

DETAILED DESCRIPTION

A mapping table is the minimum table unit for managing logical to physical address mapping on a nonvolatile memory (NVM) System. Mapping tables are stored in mapping pages in a NVM storage, together with user data. When a host device issues a read command, the NVM system reads user data from the NVM storage to a cache memory, and it may also access/read mapping pages to load mapping tables from the NVM storage to the cache memory. In some cases, a system cannot accept a long waiting time. For example, the system can only accept a waiting time for reading one mapping page. However, an actual reading may cost two mapping page reading times, which can cause an over NVM page boundary problem where more than one mapping page reading time is used.

Implementations of the present disclosure provide systems and methods for partially overlapping ranges of mapping tables in mapping pages, which can efficiently prevent the over NVM page boundary problem. For example, it can be assumed that a maximum count of a host read command is not over 3 mapping tables and that a mapping page contains X+2 mapping tables. It is determined that 2 mapping tables can be duplicated in two adjacent mapping pages to obtain an overlapped range. That is, the last 2 mapping tables (X+1, X+2) in a first mapping page is written again as the first 2 mapping tables in a second, sequential mapping page which may store mapping tables from X+1, X+2 to 2X+1, 2X+2. If a host read command needs to read logical addresses in mapping tables X, X+1, X+2, the NVM system can read from the first mapping page only. If a host read command needs to read logical addresses in mapping tables X+1, X+2, X+3, the NVM system can read from the second mapping page only. In such a way, the over NVM page boundary problem can be prevented and a reading speed (thus an operation performance) of the NVM system can be increased.

Figure 1:
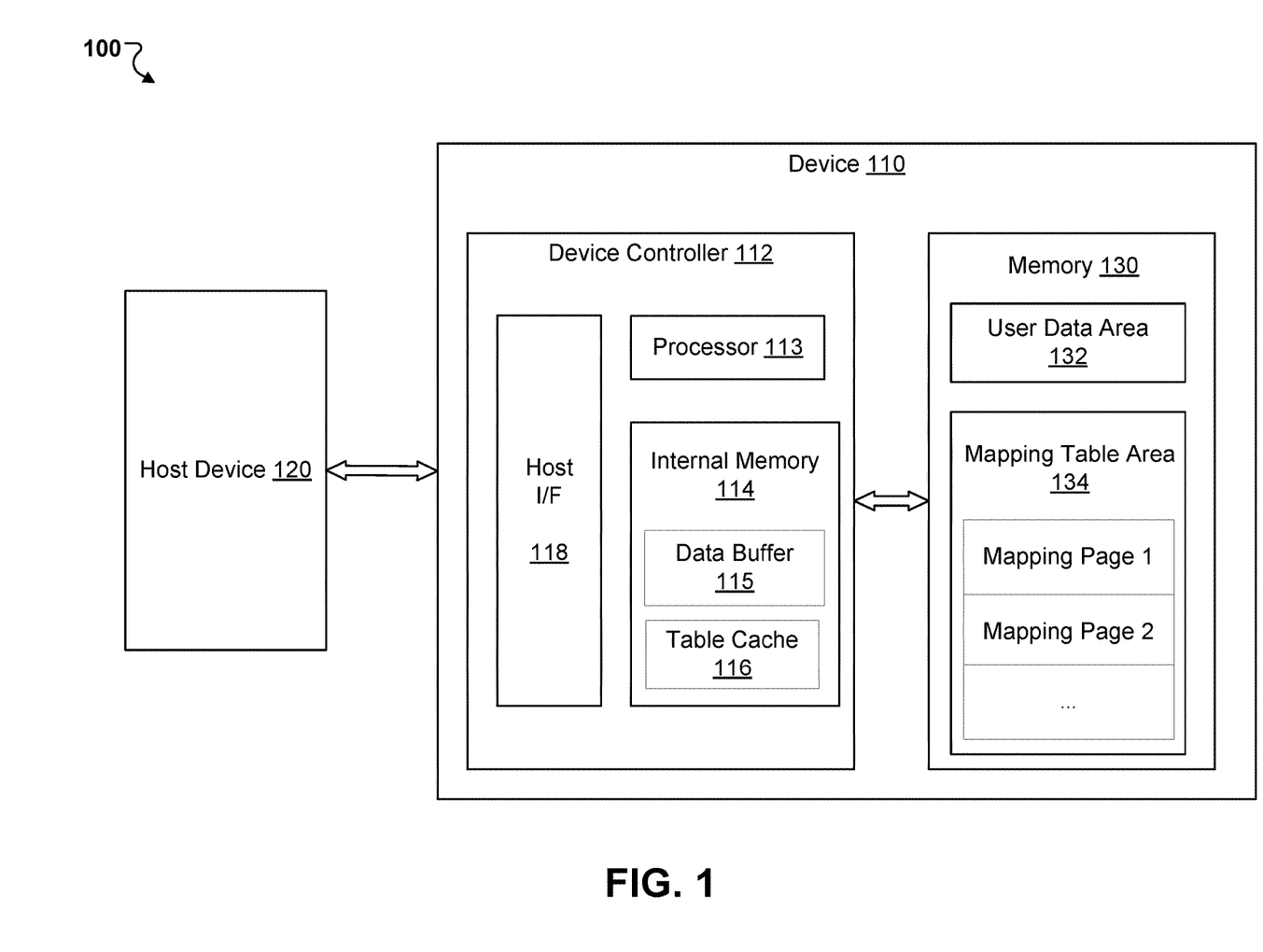
FIG. 1 illustrates an example of a system using mapping pages for data storage and retrieval, according to one or more implementations.

FIG. 1 illustrates an example of a system 100 using mapping table pages for data storage and retrieval, according to one or more implementations. The system 100 includes a device 110 and a host device 120. The device 110 includes a device controller 112 and a memory 130. The device controller 112 includes a processor 113, an internal memory 114, and a host interface (I/F) 118. The host interface 118 is an interface for the device controller 112 in communication with the host device 120. For example, through the host interface 118, the device controller 112 can receive write or read commands and host data from the host device 120 or transmit user data retrieved from the memory 130 to the host device 120.

In some implementations, the device 110 is a storage device. For example, the device 110 can be an embedded multimedia card (eMMC), a secure digital (SD) card, a solid-state drive (SSD), or some other suitable storage. In some implementations, the device 110 is a smart watch, a digital camera or a media player. In some implementations, the device 110 is a client device that is coupled to a host device 120. For example, the device 110 is an SD card in a digital camera or a media player that is the host device 120.

The device controller 112 is a general-purpose microprocessor, or an application-specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller that is different from a memory controller.

The processor 113 is configured to execute instructions and process data. The instructions include firmware instructions and/or other program instructions that are stored as firmware code and/or other program code, respectively, in a secondary memory. The data includes program data corresponding to the firmware and/or other programs executed by the processor, among other suitable data. In some implementations, the processor 113 is a general-purpose microprocessor, or an application-specific microcontroller. The processor 113 is also referred to as a central processing unit (CPU).

The processor 113 accesses instructions and data from the internal memory 114. In some implementations, the internal memory 114 is a Static Random Access Memory (SRAM) or a Dynamic Random Access Memory (DRAM). For example, in some implementations, when the device 110 is an eMMC, an SD card or a smart watch, the internal memory 114 is an SRAM. In some implementations, when the device 110 is a digital camera or a media player, the internal memory 114 is DRAM.

In some implementations, the internal memory 114 is a cache memory that is included in the device controller 112, as shown in FIG. 1. The internal memory 114 stores instruction codes, which correspond to the instructions executed by the processor 113, and data and/or mapping tables that are requested by the processor 113 during runtime.

The device controller 112 transfers the instruction code and/or the data from the memory 130 to the internal memory 114. In some implementations, the memory 130 is a non-volatile memory (NVM) that is configured for long-term storage of instructions and/or data, e.g., a NAND flash memory device, or some other suitable non-volatile memory device, and the device 110 is a NVM system. In implementations where the memory 130 is NAND flash memory, the device 110 is a flash memory device, e.g., a flash memory card, and the device controller 112 is a NAND flash controller. For example, in some implementations, when the device 110 is an eMMC or an SD card, the memory 130 is a NAND flash; in some implementations, when the device 110 is a digital camera, the memory 130 is an SD card; and in some implementations, when the device 110 is a media player, the memory 130 is a hard disk. For illustration purposes only, the following description uses a non-volatile memory (NVM) as an example of the memory 130, an SRAM as an example of the internal memory 114, and a memory controller as an example of the device controller 112.

As discussed in further details below, the device controller 112 is configured to write data and corresponding mapping pages in the memory 130 in response to a write command from the host device 120 and to read one or more mapping tables and corresponding data from the memory 130 in response to a read command.

The memory 130 includes a user data area 132 for storing user data and a mapping table area 134 for storing a number of mapping pages. Each mapping page can contain (or store) a specific maximum number of mapping tables (e.g., a maximum table number). Each mapping table includes a specific number of logical addresses that are sequential. Logical addresses in adjacent mapping tables in a mapping page are also sequential. The logical addresses in the mapping tables correspond to respective physical addresses in the user data area 132. User data is stored in the user data area 132 at memory locations corresponding to the physical addresses.

The internal memory 114 includes a data buffer 115 and a table cache 116. The data buffer 115 can cache/store host data from the host device 120 that is to be stored in the user data area 132 in the memory 130, e.g., in response to a write demand from the host device 120. The data buffer 115 can also cache/store user data retrieved from the user data area 132 in the memory 130 to be transmitted to the host device 120, e.g., in response to a read demand from the host device 120.

When the host device 120 sends a write demand to store host data, the table cache 116 can store mapping tables generated based on the host data that is to be stored or already stored in the user data area 132. When the number of mapping tables reaches the maximum number of mapping tables that can be contained in a mapping page, the number of mapping tables are programmed as a new mapping page into the mapping table area 134.

When the host device 120 sends a read demand to read user data from the user data area 132, if the table cache 116 does not already include the corresponding mapping tables for the user data, the device controller 112 can determine the mapping tables that correspond to the user data and load the corresponding mapping tables from the mapping table area 134 into the table cache 116. Then the device controller 112 can identify physical addresses corresponding to the user data based on the mapping tables and retrieve the user data from the user data area 132 based on the identified physical addresses.

Figure 2A:
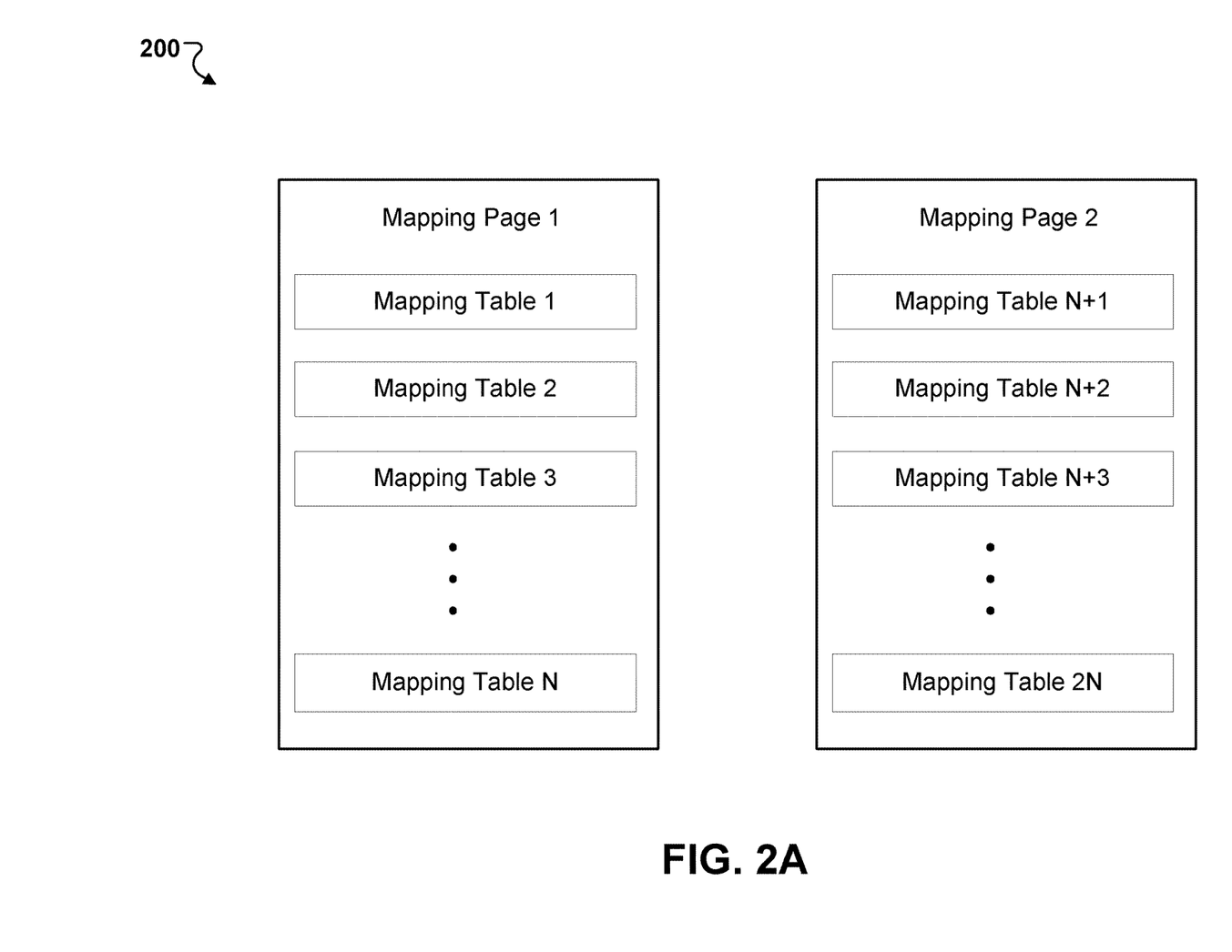
FIG. 2A illustrates an example of mapping pages without duplicated mapping tables.

FIG. 2A illustrates an example 200 of mapping pages without duplicated mapping tables. As noted above, each mapping page contains a specific maximum number N of mapping tables, where N is an integer greater than 1. Each mapping table includes a specific maximum number M of logical addresses, where M is an integer greater than 1. Adjacent mapping tables include sequential logical addresses. For example, mapping table 1 in mapping page 1 includes logical addresses from 1 to M, and mapping table 2 in mapping page 1 includes logical addresses from M+1 to 2M. Accordingly, mapping table N in mapping page 1 includes logical addresses from M*(N−1)+1 to M*N.

Mapping page 2 is adjacent to mapping page 1 and includes sequential mapping tables to the mapping tables in mapping page 1. As illustrated in FIG. 2A, mapping page 2 contains mapping tables from N+1 to 2N that include logical addresses from M*N+1 to M*2N. That is, the first mapping table N+1 in mapping page 2 is sequential (or next) to the last mapping table N in mapping page 1, and the first logical address M*N+1 in the mapping table N+1 is sequential (or next) to the last logical address M*N in the mapping table N. There is no mapping table duplicated in the mapping pages 1 and 2 and there is no overlapped range in the mapping pages 1 and 2, as illustrated in FIG. 2A.

If a host read command includes logical addresses within one mapping page, e.g., from mapping table N+1 to mapping table N+4, a memory controller, e.g., the device controller 112 of FIG. 1, need only read mapping page 2 to load mapping tables N+1, N+2, N+3 and N+4 from mapping page 2 to a table cache, e.g., the table cache 116 of FIG. 1.

Figure 2B:
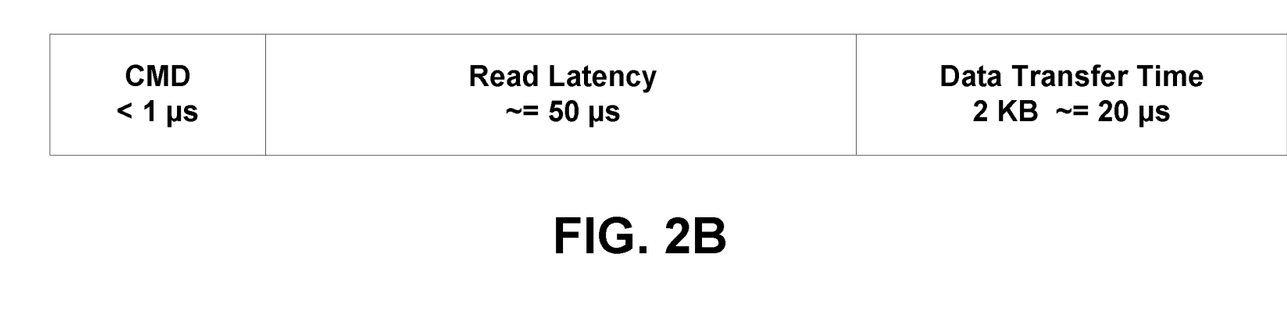
FIG. 2B shows an example time cost for reading mapping tables from a same mapping page.

FIG. 2B shows an example time cost for reading the four mapping tables from the same mapping page. The time cost includes a command (CMD) read time for reading the host read command, a read latency for accessing/reading a mapping page, and a data transfer time for transferring mapping tables to the table cache. The read latency is a specific value for reading (or accessing) a mapping page in a memory, e.g., the memory 130 of FIG. 1. It can be a property of the memory and independent from data to be transferred from a mapping page. For example, the read latency for reading a mapping page in the memory can be about 50 microsecond (μs). In a particular example, the four mapping tables have 2 kilobytes (KB or kB) data. The CMD read time is less than 1 μs and the data transfer time for transferring 2 KB data is about 20 μs. Thus, the total time cost for reading four mapping tables from the same mapping page 2 is about 70 μs.

Returning to FIG. 2A, if a host read command includes a range of logical addresses that correspond to mapping tables from mapping page 1 and mapping page 2, e.g., from mapping table N−1 to mapping table N+2, the memory controller may need to read both mapping page 1 and mapping page 2 to load two mapping tables N−1 and N from mapping page 1 and two mapping tables N+1 and N+2 from mapping page 2 to the table cache. As noted above, reading from two different mapping pages can cause an over NVM page boundary problem, thereby causing a longer reading time.

Figure 2C:
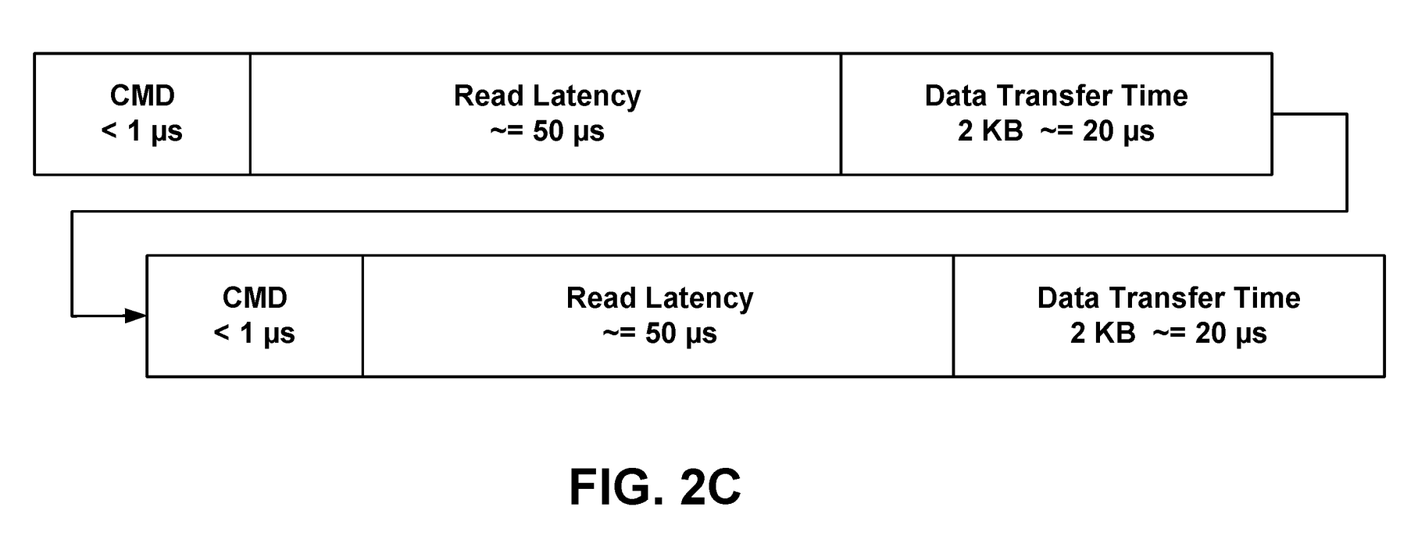
FIG. 2C shows an example time cost for reading mapping tables from two different mapping pages.

FIG. 2C shows an example time cost for reading the four mapping tables from two different mapping pages. For reading mapping page 1, the time cost includes a CMD read time (<1 μs), the read latency (~50 μs), and a data transfer time for transferring 1 KB data of the mapping tables N−1 and N (~10 μs). For reading mapping page 2, the time cost includes a CMD read time (<1 μs), the read latency (~50 μs), and a data transfer time for transferring 1 KB data of the mapping tables N+1 and N+2 (~10 μs). Thus, the total reading cost for reading four mapping tables from two different mapping pages is about 120 μs, which is longer than the total reading cost for reading four mapping tables from the same mapping page (70 μs). Particularly, one read latency time (~50 μs) is saved when the same amount of data is read from a same mapping page compared to from two different mapping pages.

Figure 3A:
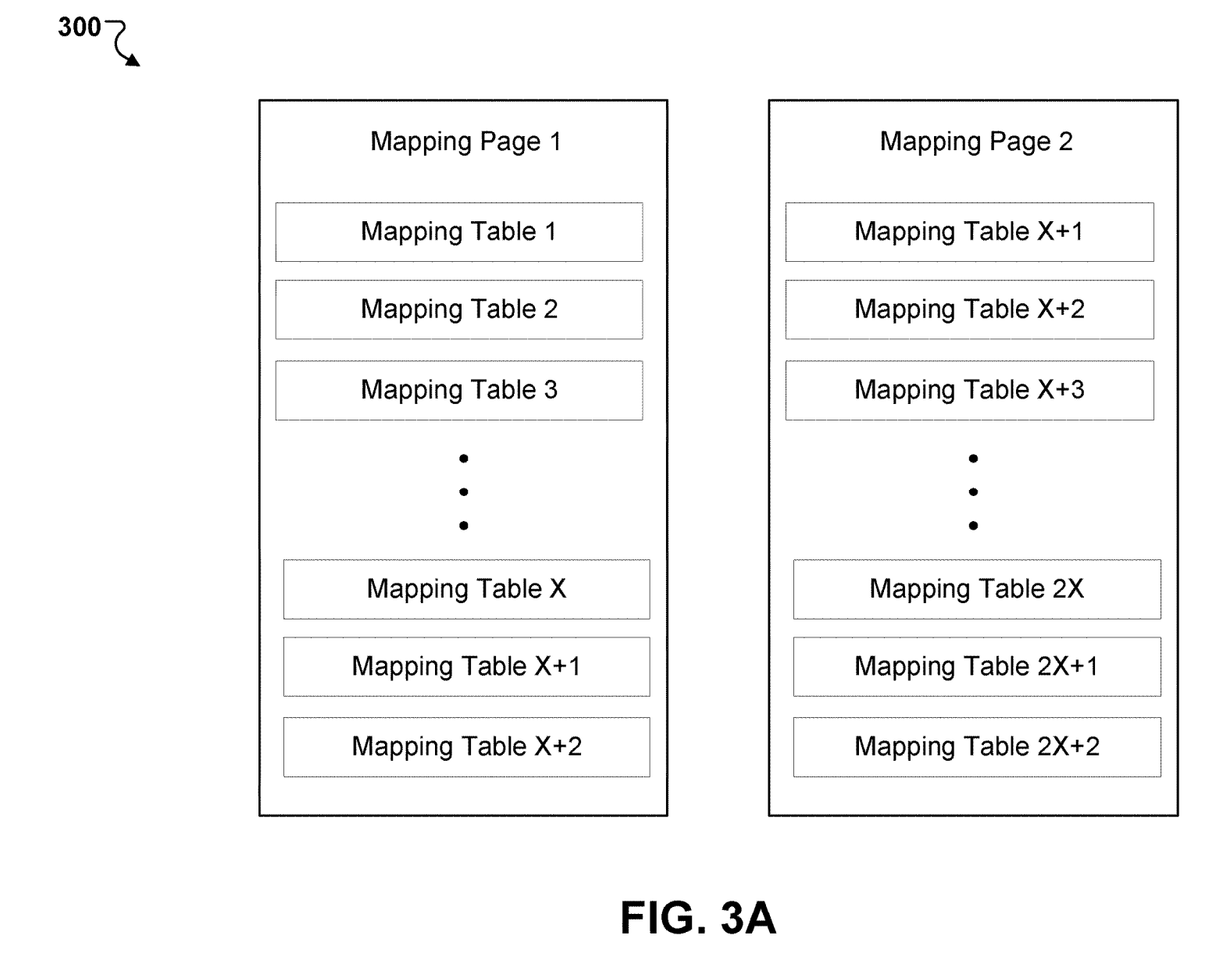
FIG. 3A illustrates an example of mapping pages including duplicated mapping tables with an overlapped range, according to one or more implementations.

FIG. 3A illustrates an example 300 of mapping pages including duplicated mapping tables with an overlapped range, according to one or more implementations. The mapping pages can be stored in a memory, e.g., the memory 130 of FIG. 1, of a memory device, e.g., the device 110 of FIG. 1. The memory is coupled to a memory controller, e.g., the device controller 112 of FIG. 1. The memory controller is in communication with a host device, e.g., the host device 120 of FIG. 1.

The memory controller can determine a maximum number Q of mapping tables to be read for a host read command from the host device, where Q is an integer greater than 1. The maximum number Q can be called as a maximum read number. For example, the host read command is related to reading data with a range of sequential logical addresses. The maximum number of the logical addresses is no more than the number of logical addresses in a particular number P of mapping tables, where P is an integer no less than 1. If the logical addresses in the host read command starts from a beginning of a mapping table, the logical addresses is included in P mapping tables; if the logical addresses in the host read command starts from a position within a mapping table, that is, not at the beginning of the mapping table, the logical addresses may be included in P+1 mapping tables. Thus, the maximum number Q of mapping tables to be read for the host read command can be determined to be P+1, that is, Q=P+1.

In some cases, the memory controller can determine the maximum number Q of mapping tables, the maximum number of the logical addresses, or the particular number P of mapping tables from a communication protocol between the memory device (e.g., the memory controller) and the host device. For example, when the host device starts a communication with the memory device, the host device and the memory device can agree on the maximum number of the logical addresses to be read in a host read command is no more than the number of logical addresses in the particular number P of mapping tables.

In some cases, the memory controller can determine the maximum number Q of mapping tables, the maximum number of the logical addresses, or the particular number P of mapping tables based on historical or experiential data between communications between the memory device and the host device.

To prevent the over one NVM page boundary problem, Q−1 (or P) mapping tables can be duplicated in adjacent mapping pages in the memory, such that ranges of mapping tables stored in the adjacent mapping pages are overlapped. In such a way, the memory controller can read only one mapping page to obtain mapping tables required by a host read command.

As illustrated in FIG. 3A, each mapping page contains a maximum number X+2 of mapping tables, where X is an integer no less than 0. The memory controller determines that the maximum number Q of mapping tables to be read for a host read command is 3. Thus, 2 mapping tables are determined to be duplicated in adjacent mapping pages to obtain an overlapped range. For example, mapping page 1 contains mapping tables from 1 to X+2, and mapping page 2 contains mapping tables from X+1 to 2X+2. Two mapping tables X+1 and X+2 are duplicated in mapping pages 1 and 2. That is, the last two mapping tables in mapping page 1 are written again as the first two mapping tables in mapping page 2.

Figure 3B:
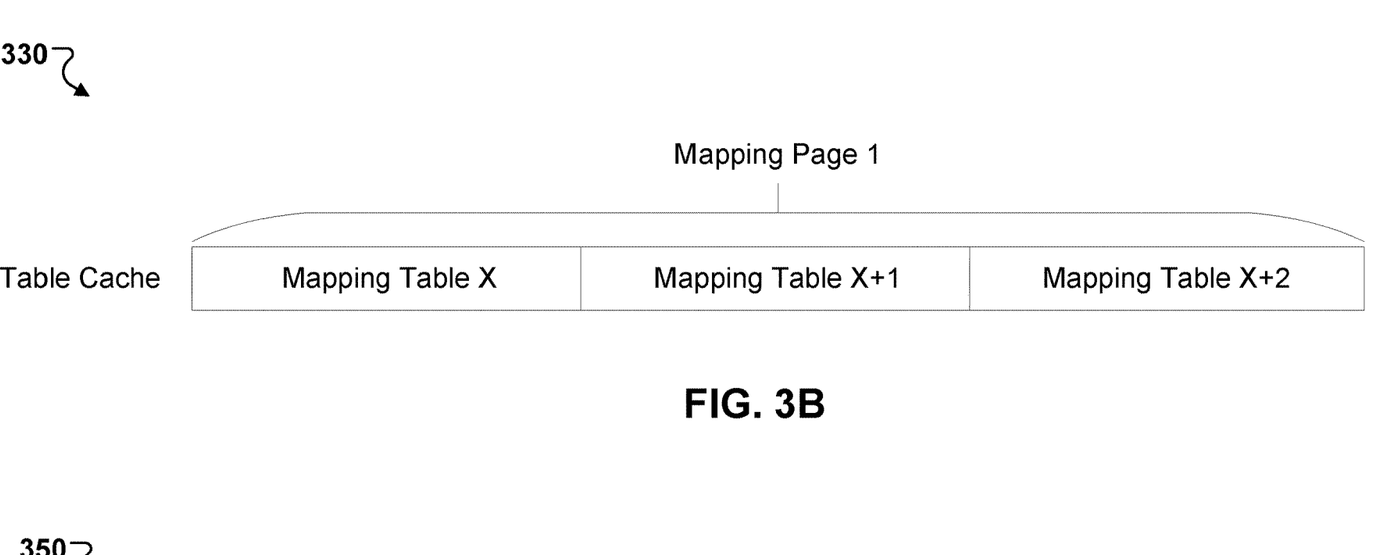
FIG. 3B shows an example table cache with mapping tables from a front page including duplicated mapping tables with an overlapped range, according to one or more implementations.

FIG. 3B shows an example table cache with mapping tables loaded from a front memory page including duplicated mapping tables having the overlapped range. For example, if a host read command needs to read data associated with logical addresses in mapping tables X, X+1, and X+2, the memory controller can only read memory page 1 and load the mapping tables X, X+1, and X+2 into a table cache, e.g., the table cache 116 of FIG. 1.

Figure 3C:
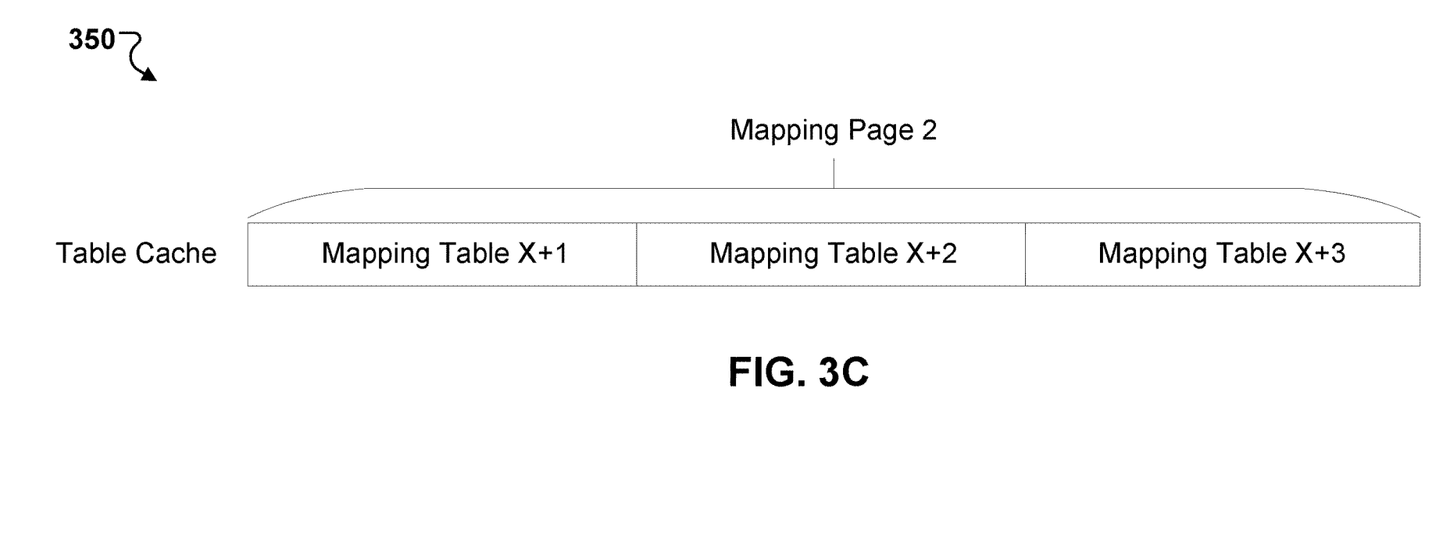
FIG. 3C shows an example table cache with mapping tables from a rear page including duplicated mapping tables with an overlapped range, according to one or more implementations.

FIG. 3C shows an example table cache with mapping tables from a rear mapping page including duplicated mapping tables having the overlapped range. For example, if a host read command needs to read data associated with logical addresses in mapping tables X+1, X+2, and X+3, the memory controller can only read memory page 2 and load the mapping tables X+1, X+2, and X+3 into the table cache.

Figure 4A:
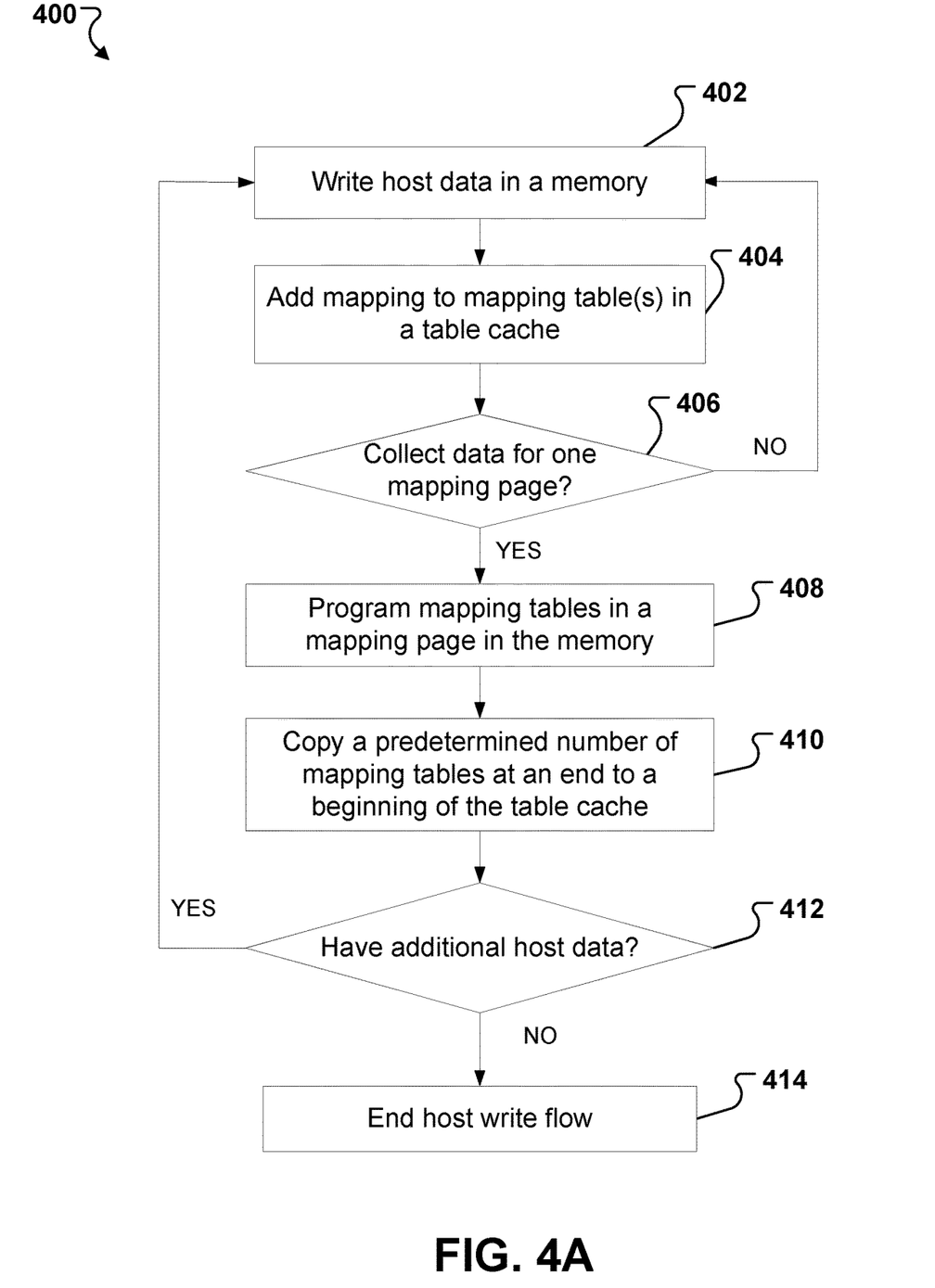
FIG. 4A illustrates an example of a process of writing host data with overlapping ranges of mapping tables in memory pages, according to one or more implementations.

FIG. 4A illustrates an example of a process 400 of writing host data with overlapping ranges of mapping tables in mapping pages, according to one or more implementations. The process 400 can be performed by a memory controller, e.g., the device controller 112 of FIG. 1. Mapping tables are stored in mapping pages in a memory, e.g., the memory 130 of FIG. 1, coupled to the memory controller. The host data is transmitted from a host device, e.g., the host device 120 of FIG. 1.

The host data is written in the memory (402). After receiving the host data, e.g., from an interface such as the host interface 118 of FIG. 1, the memory controller can first buffer the host data in a data buffer of an internal memory in the memory controller, e.g., the data buffer 115 of FIG. 1, and then write the host data from the data buffer to a user data area of the memory, e.g., the user data area 132 of FIG. 1. The memory controller can determine physical addresses of the host data stored in the memory.

Mapping between logical addresses and the physical addresses is added to one or more mapping tables (404) in a table cache of the internal memory of the memory controller, e.g., the table cache 116 of FIG. 1. The memory controller can determine the logical addresses based on the physical addresses associated with the host data. The memory controller can add the mapping between the logical addresses and the physical addresses to a latest mapping table and/or a new empty mapping table in the table cache.

The memory controller determines whether data for one mapping page has been collected (406). In the memory, one mapping page can contain a specific maximum number of mapping tables. The memory controller determines whether data for one mapping page has been collected by determining whether the table cache contains the specific maximum number of mapping tables. If the number of mapping tables in the table cache is less than the specific maximum number, the memory controller determines that the mapping data collected in the table cache is less than one mapping page. If the number of mapping tables in the table cache is identical to the specific maximum number, the memory controller determines that data for one mapping page has been collected.

In response to determining that data less than one mapping page has been collected in the table cache, the process 400 returns to step 402. In response to determining that data for one mapping page has been collected, the process 400 proceeds to step 408.

The data for one mapping page is programmed into a mapping page in the memory (408). The memory controller can program the number of mapping tables in the table cache into the mapping page in a mapping table area in the memory, e.g., the mapping table area 134 of FIG. 1.

A predetermined number of mapping tables from the end of the sequence of mapping tables in the table cache are copied to a beginning of the table cache for a next mapping page (410). As noted above, the memory controller can determine the number P of mapping tables to be duplicated, e.g., based on a maximum number Q of mapping tables to be read in a host read command. The last P mapping tables programmed in the mapping page are copied to the beginning of the table cache. The others mapping tables programmed in the mapping page can be cleared from the table cache if there is more host data to be written or can be kept in the table cache if there is no more host data to be written.

The memory controller determines whether there is additional host data (412). For example, the memory controller can determine whether there is additional host data to be written based on a host write demand. In response to determining that there is additional host data, the process 400 returns to step 402. In response to determining that there is no additional host data, the process continues to step 414, where a host write flow ends. The memory controller can transmit information about the logical addresses (and/or mapping tables) associated with the host data written in the memory in the flow to the host device. The host device can use the logical addresses to retrieve the host data stored in the memory.

Figure 4B:
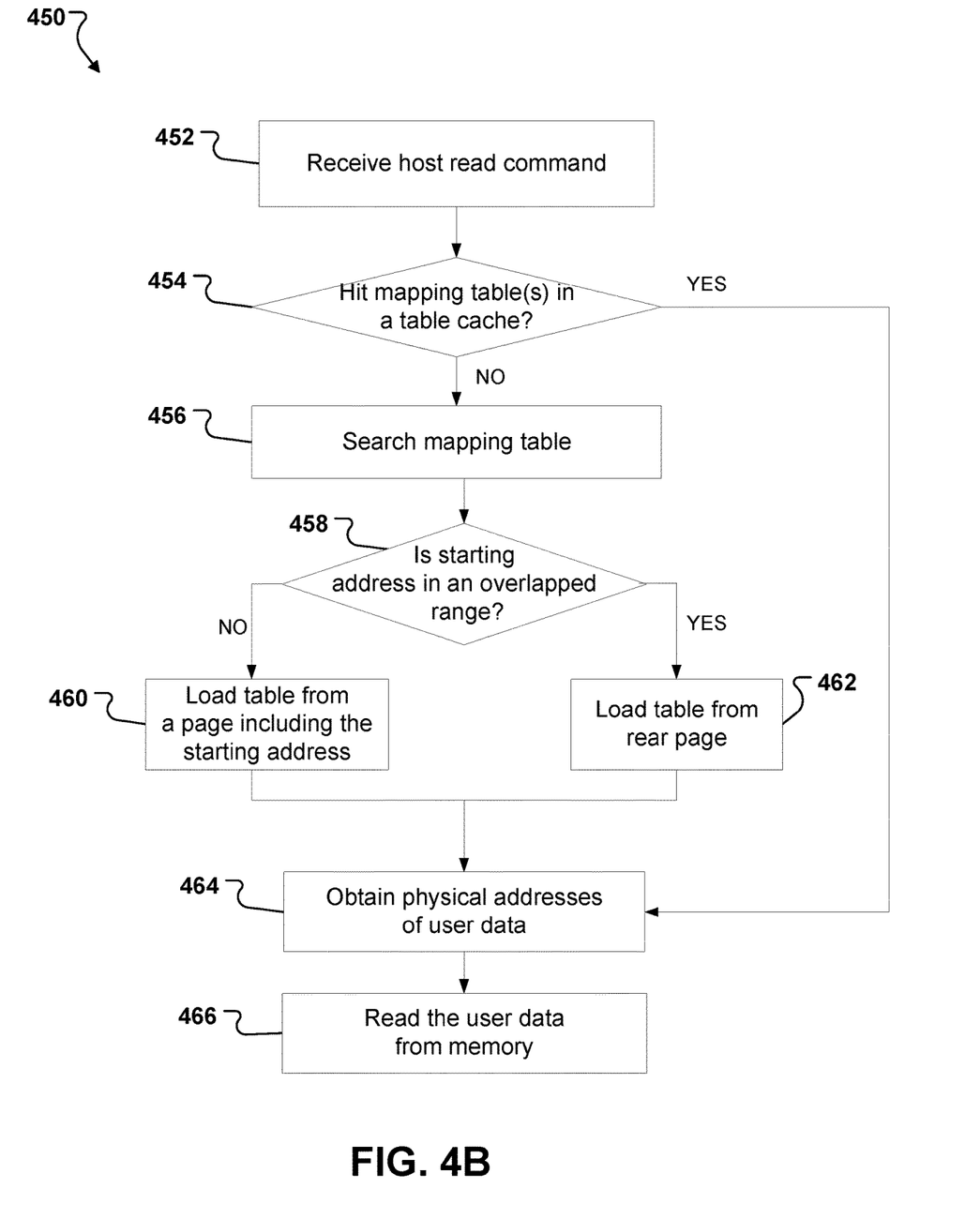
FIG. 4B illustrates an example of a process of reading user data with overlapped ranges of memory pages, according to one or more implementations.

FIG. 4B illustrates an example of a process 450 of reading user data with overlapped ranges of mapping tables, according to one or more implementations. The process 450 can be performed by a memory controller, e.g., the device controller 112 of FIG. 1 or the memory controller of FIG. 4A. Mapping tables are stored in mapping pages in a memory, e.g., the memory 130 of FIG. 1, coupled to the memory controller. The host data is transmitted from a host device, e.g., the host device 120 of FIG. 1.

A host read command is received (452). The host read command includes information indicating the data to be read from the memory. The data information can include a range of logical addresses associated with the data. The data information can also include information about mapping tables including the range of addresses. The number of the mapping tables including the range of addresses is no more than a predetermined maximum number Q for the host read command, as discussed above.

The memory controller determines whether the range of logical addresses associated with the host read command hits one or more mapping tables in a table cache (454). The table cache can be the table cache 116 of FIG. 1 or the table cache of FIG. 4A. As noted above, the table cache can store one or more mapping tables to be programmed into a mapping page. After the programming, the number of mapping tables can be kept in the table cache if there is no new data writing. The memory controller determines whether the range of logical addresses associated with the host read command is in the number of mapping tables kept in the table cache, e.g., by determining the range of logical addresses is between a minimum logical address and a maximum logical address of the number of mapping tables kept in the table cache.

In response to determining that the range of logical addresses associated with the host read command hits the mapping tables in the table cache, the process 450 proceeds to step 464, where physical addresses of user data associated with the range of logical addresses are obtained. The memory controller can determine mapping tables including the range of logical addresses in the table cache and determine the physical addresses of the user data associated with the range of logical addresses based on mappings in the determined mapping tables. Then the user data is read from the memory based on the obtained physical addresses (466).

In response to determining that the range of logical addresses associated with the host read command is not in the table cache or not completely in the table cache, the process 450 proceeds to step 456, where the memory controller searches the mapping tables in mapping pages stored in the memory. The memory controller can search the mapping tables in the mapping pages based on the information of the mapping tables and/or the information of the logical addresses associated with the host read command.

The memory controller determines whether a starting logical address of the range of logical addresses associated with the host read command is in an overlapped range of two adjacent mapping pages (458). As noted above, the adjacent mapping pages can include the overlapped range. For example, a particular number P of mapping tables are duplicated and ranges of mapping tables in the adjacent mapping pages are overlapped, and the overlapped range of the adjacent mapping pages is a range of logical addresses of the duplicated P number of mapping tables.

In response to determining that the starting logical address of the range of logical addresses is not in the overlapped range but in the two adjacent mapping pages, the memory controller loads the memory tables including the range of logical addresses from whichever mapping page includes the starting logical address (460). This mapping page can be front or rear mapping page of the two adjacent mapping pages. In some cases, if the starting logical address is smaller than a minimum logical address in the overlapped range and in the front mapping page, the memory controller loads the memory tables including the range of logical addresses from the front mapping page. In some cases, if the starting logical address is larger than a maximum logical address in the overlapped range and in the rear mapping page, the memory controller loads the memory tables including the range of logical addresses from the rear mapping page. Otherwise, in response to determining that the starting logical address of the range of logical addresses is in the overlapped range, the memory controller loads the memory tables including the range of logical addresses from the rear mapping page (462).

For example, as illustrated in FIG. 3A above, mapping pages 1 and 2 have duplicated mapping tables X+1 and X+2 and have an overlapped range including a range of logical addresses of mapping tables X+1 and X+2. If the starting logical address is in mapping table X, that is, not in the overlapped range, the memory controller determines to read memory page 1 to load the memory tables X, X+1, X+2 from memory page 1 into the table cache, as illustrated in FIG. 3B above. If the starting logical address in the mapping table X+1, that is, in the overlapped range, the memory controller determines to read memory page 2 to load the memory tables X+1, X+2, and X+3 into the table cache, as illustrated in FIG. 3C above. In either case, only one mapping page is read to load mapping tables including the range of logical addresses into the table cache.

After loading the memory tables from the front/rear mapping page (step 460) or loading from the memory tables from the rear mapping page (step 462), the process 450 continues to proceed step 464 and step 466, as noted above.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A memory system for managing a memory by overlapping ranges of mapping pages, the memory system comprising:
a memory controller coupled to the memory and configured to:
write input data in the memory, the written input data having corresponding physical addresses;
add mappings between the physical addresses and logical addresses to one or more mapping tables in a table cache of the memory controller;
determine that a number of mapping tables in the table cache reaches a threshold number;
program the mapping tables in the table cache into a first mapping page in the memory; and
copy one or more particular mapping tables programmed at an end of the first mapping page to a beginning of the table cache in a second, sequential mapping page to form an overlapped range of mapping tables between the first and second mapping pages.

2. The memory system of claim 1, wherein the memory controller is configured to program the one or more particular mapping tables at the end of the first mapping page to a beginning of the second mapping page, and
wherein the one or more particular mapping tables are duplicated in the first and second mapping pages, and a range of logical addresses of the one or more particular mapping tables forms the overlapped range of the first and second mapping pages.

3. The memory system of claim 1, wherein each mapping page in the memory is capable of storing a maximum table number of mapping tables, and
wherein the threshold number is identical to the maximum table number.

4. The memory system of claim 1, wherein the memory controller is configured to receive a host read command from a host device,
wherein the read command is allowable to read user data associated with a range of logical addresses included in a maximum read number of mapping tables in the memory, and
wherein a number of the one or more particular mapping tables is identical to the maximum read number minus 1.

5. The memory system of claim 4, wherein the maximum read number of mapping tables for the host read command is determined based on a communication protocol between the memory controller and the host device.

6. The memory system of claim 4, wherein a number of logical addresses in the range of logical addresses is no more than a number of logical addresses included in the one or more particular mapping tables.

7. The memory system of claim 1, wherein the memory controller is configured to determine the logical addresses mapped with the physical addresses based on the physical addresses and information of the mapping tables in the table cache.

8. A memory system for managing a memory by overlapping ranges of mapping pages, the memory system comprising:
a memory controller coupled to the memory and configured to:
determine a range of logical addresses associated with a command;
search particular mapping tables including the range of logical addresses in mapping pages in the memory, wherein a mapping page in the memory comprises sequential mapping tables and adjacent mapping pages in the memory comprise one or more duplicated mapping tables with an overlapped range;
determine whether a starting address of the range of logical addresses is in a respective overlapped range of first and second mapping pages in the memory, the second mapping page being sequential to the first mapping page, the first and second mapping pages including one or more respective duplicated mapping tables, a range of logical addresses of the respective duplicated mapping tables forming the respective overlapped range of the first and second mapping pages;
determine which of the first and second mapping pages from which the particular mapping tables to be loaded based on a result of determining whether the starting address is in the respective overlapped range of the first and second mapping pages; and
load the particular mapping tables from the determined mapping page.

9. The memory system of claim 8, wherein the memory controller is configured to:
in response to determining that the starting address is in the overlapped range of the first and second mapping pages, load the particular mapping tables from the second mapping page.

10. The memory system of claim 8, wherein the memory controller is configured to:
in response to determining that the starting address of the range of logical addresses is smaller than a minimum logical address of the overlapped range and in the first mapping page, load the particular mapping tables from the first mapping page; and
in response to determining that the starting address of the range of logical addresses is larger than a maximum logical address of the overlapped range and in the second mapping page, load the particular mapping tables from the second mapping page.

11. The memory system of claim 8, wherein the memory controller is configured to:
obtain physical addresses mapped to the range of logical addresses based on the loaded particular mapping tables; and
read user data having the obtained physical addresses from the memory.

12. The memory system of claim 8, wherein the first mapping page comprises the respective duplicated mapping tables at an end of the first mapping page, and the second mapping page comprises the respective duplicated mapping tables at a beginning of the second mapping page.

13. The memory system of claim 8, wherein the command is allowable to read user data associated with logical addresses included in a maximum read number of mapping tables in the memory, and
wherein a number of the respective duplicated mapping tables is identical to the maximum read number minus 1.

14. The memory system of claim 13, wherein the maximum read number of mapping tables for the command is determined based on a communication protocol between the memory controller and a host device transmitting the command.

15. The memory system of claim 8, wherein the memory controller is configured to:
determine that a second range of logical addresses associated with a second command is included in second particular mapping tables in a table cache of the memory controller;
obtain second physical addresses mapped to the second range of logical addresses based on the second particular mapping tables in the table cache; and
read user data having the obtained second physical addresses from the memory.

16. The memory system of claim 8, wherein the memory controller is configured to:
search the particular mapping tables including the range of logical addresses in the mapping pages in the memory in response to determining that the range of logical addresses is not included in second particular mapping tables in a table cache of the memory controller.

17. A memory system for managing a memory by overlapping ranges of mapping pages, the memory system comprising:
a memory controller coupled to the memory and configured to:
receive a host write command from a host device;
write host data associated with the host write demand in the memory, the written host data having corresponding physical addresses in the memory;
add mappings between the physical addresses and logical addresses to mapping data in a cache of the memory controller;
program the mapping data in the cache into first and second adjacent mapping pages, wherein the first and second adjacent mapping pages have an overlapped range including logical addresses of particular mapping data;
receive a host read command from the host device;
determine a range of logical addresses associated with the host read command;
load, to the cache, corresponding mapping data including the range of logical addresses from a particular mapping page in the memory;
obtain physical addresses mapped to the range of logical addresses based on the loaded corresponding mapping data; and
read user data having the obtained physical addresses from the memory.

18. The memory system of claim 17, wherein the memory controller is configured to program the mapping data in the cache into the first and second adjacent mapping pages by
determining that a number of mapping tables in the cache reaches a table number of mapping tables capable to be stored in a memory page of the memory,
programming the mapping tables in the table cache into the first mapping page in the memory,
copying one or more particular mapping tables programmed at an end of the first mapping page to a beginning of the cache, and
programming the second mapping page including the one or more particular mapping tables of the first mapping page at a beginning of the second mapping page,
wherein the one or more particular mapping tables are the duplicated particular mapping data of the first and second mapping pages, and wherein a range of the one or more particular mapping tables forms the overlapped range of the first and second mapping pages.

19. The memory system of claim 17, wherein the memory controller is configured to:
search the corresponding mapping data including the range of logical addresses in mapping pages in the memory;
determine whether a starting address of the range of logical addresses is in the overlapped range of the first and second mapping pages in the memory;
determine which of the first and second mapping pages to be the particular memory page from which the corresponding mapping data to be loaded based on a result of determining whether the starting address is in the overlapped range of the first and second mapping pages; and
load, to the cache, the corresponding mapping data including the range of logical addresses from the particular mapping page in the memory.

20. The memory system of claim 19, wherein the memory controller is configured to:
in response to determining that the starting address is in the overlapped range of the first and second mapping pages, load the corresponding mapping data from the second mapping page;
in response to determining that the starting address of the range of logical addresses is smaller than a minimum logical address of the overlapped range and in the first mapping range, load the corresponding mapping data from the first mapping page; and
in response to determining that the starting address of the range of logical addresses is larger than a maximum logical address of the overlapped range and in the second mapping page, load the corresponding mapping data from the second mapping page.

21. A memory system for managing a memory by overlapping ranges of mapping pages in the memory, the memory system comprising:
a memory controller coupled to the memory and configured to:
program mapping data into a first mapping page in the memory; and
copy a portion of the mapping data programmed at an end of the first mapping page to a beginning of a second mapping page to form an overlapped range of the first and second mapping pages, the second mapping page being sequential to the first mapping page in the memory.

\* \* \* \* \*